United States Patent
Madigan

(10) Patent No.: US 7,147,229 B2
(45) Date of Patent: Dec. 12, 2006

(54) SHAFT SEAL ASSEMBLY WITH RETAINING RING AND WASHER

(75) Inventor: Christopher Madigan, Brighton, MI (US)

(73) Assignee: Federal Mogul World Wide Inc., Southfield, MI (US)

( * ) Notice: Subject to any disclaimer, the term of this patent is extended or adjusted under 35 U.S.C. 154(b) by 62 days.

(21) Appl. No.: 10/800,456

(22) Filed: Mar. 15, 2004

(65) Prior Publication Data
US 2005/0200082 A1    Sep. 15, 2005

(51) Int. Cl.
*F16J 15/32* (2006.01)

(52) U.S. Cl. .................. 277/551; 277/568; 277/572; 277/576

(58) Field of Classification Search ............ 277/549, 277/551, 562, 568, 569, 572, 576–577
See application file for complete search history.

(56) References Cited

U.S. PATENT DOCUMENTS

| | | | |
|---|---|---|---|
| 2,466,335 A * | 4/1949 | Stearns | 277/577 |
| 2,926,938 A * | 3/1960 | Ratti | 277/576 |
| 3,810,639 A | 5/1974 | Scannell | |
| 4,079,947 A | 3/1978 | Morris | |
| 4,102,538 A | 7/1978 | Bertin | |
| 4,159,828 A | 7/1979 | Ostling et al. | |
| 4,427,201 A * | 1/1984 | Belsanti | 277/565 |
| 4,493,490 A * | 1/1985 | Ohma | 280/276 |
| 4,623,153 A * | 11/1986 | Nagasawa | 277/551 |
| 4,696,479 A * | 9/1987 | Karcher | 277/353 |
| 4,755,115 A | 7/1988 | Akaike | |
| 4,848,776 A * | 7/1989 | Winckler | 277/349 |
| 4,943,068 A * | 7/1990 | Hatch et al. | 277/353 |
| 5,211,406 A | 5/1993 | Katzensteiner | |
| 5,299,811 A | 4/1994 | Kershaw | |
| 5,370,400 A | 12/1994 | Newton et al. | |
| 5,509,666 A * | 4/1996 | Abraham et al. | 277/562 |
| 5,522,600 A | 6/1996 | Duckwall | |
| 5,553,869 A | 9/1996 | Stamback | |
| 5,595,697 A * | 1/1997 | Wada et al. | 264/135 |
| 5,704,719 A * | 1/1998 | Cook et al. | 384/484 |
| 5,860,656 A | 1/1999 | Obata et al. | |
| 6,050,572 A | 4/2000 | Balsells et al. | |
| 6,182,975 B1 * | 2/2001 | Matsushima et al. | 277/559 |
| 6,257,587 B1 * | 7/2001 | Toth et al. | 277/309 |
| 6,264,205 B1 | 7/2001 | Balsells | |
| 6,315,296 B1 | 11/2001 | Oldenburg | |
| 6,367,810 B1 | 4/2002 | Hatch | |
| 6,464,233 B1 | 10/2002 | Oetiker | |
| 6,516,769 B1 * | 2/2003 | McArthy | 123/188.6 |
| 6,565,096 B1 * | 5/2003 | Ikeda et al. | 277/551 |

* cited by examiner

*Primary Examiner*—Vishal Patel
(74) *Attorney, Agent, or Firm*—Robert L. Stearns; Dickinson Wright PLLC

(57) ABSTRACT

A shaft seal assembly (10) features an annular carrier (14), an annular shaft seal element (16) and an annular felt washer (18) in an integral assembly that can be installed in one step using a simple push-on tool. The washer (18) is fixed to the carrier (14), such that the carrier (14), shaft seal element (16) and washer (18) are unitized.

14 Claims, 2 Drawing Sheets

SHAFT SEAL ASSEMBLY WITH RETAINING RING AND WASHER

FIELD OF THE INVENTION

The subject invention relates to shaft seal assemblies intended for use on rotary shafts, and more particularly to a seal assembly featuring components preassembled prior to shipment to an end user to facilitate mounting and retention of the seal assembly on the shaft and relative to the bore of a shaft seal housing.

BACKGROUND OF THE INVENTION

Various seal assemblies exist in the art that are used with rotary shafts in compressors and other operating environments to seal an annular space between the shaft and a bore through which the shaft extends. Such seal assemblies are often supplied to end users with the components disassembled. Thus, the end user must reassemble the components piece-by-piece to properly reconstruct and install the seal assembly about the shaft. Such components include, but are not limited to flexible elastomeric seal members with metal carriers, retaining rings, and padded components such as washers.

The prior art assemblies typically include a flexible washer packaged separately from the other components. The separately packaged components are sold to an end user, who must then assemble the washer with the other components during installation of the same on a shaft.

SUMMARY OF THE INVENTION AND ADVANTAGES

The invention provides a shaft seal assembly for use on a rotating shaft to be sealed. The seal assembly includes an annular carrier, a radially-acting annular shaft seal element for encircling the shaft, and an annular felt washer. The washer is fixed to the carrier such that the carrier, shaft seal element and washer are unitized.

Accordingly, the shaft seal assembly eliminates loose components—the components are supplied to the end user preassembled. Thus, parts previously given separate part numbers and supplied as separate components for an end user to interconnect before final installation or otherwise install one part at a time are now consolidated into one convenient unit prior to shipment and sale to the end user. The sealing assembly can be labeled using a single part number, shipped in a single package to the end user, and then installed in a single step using a simple push-on tool. The present invention provides a particular combination of components for a shaft seal assembly, which are unitized to promote not only cost savings, but also ease of sale, distribution and use.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
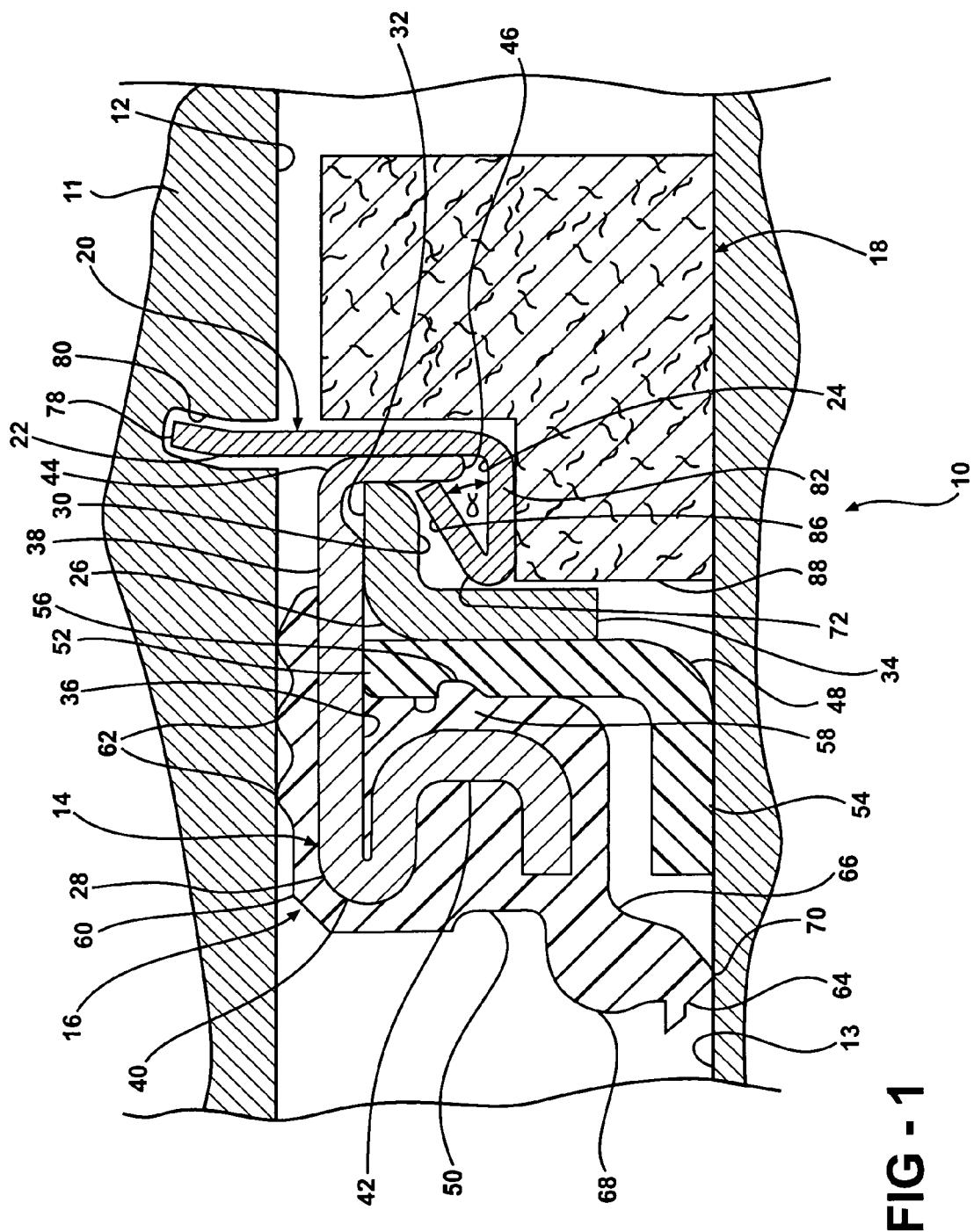
FIG. 1 is a cross sectional view of a shaft seal assembly according to the present invention.
Figure 2:
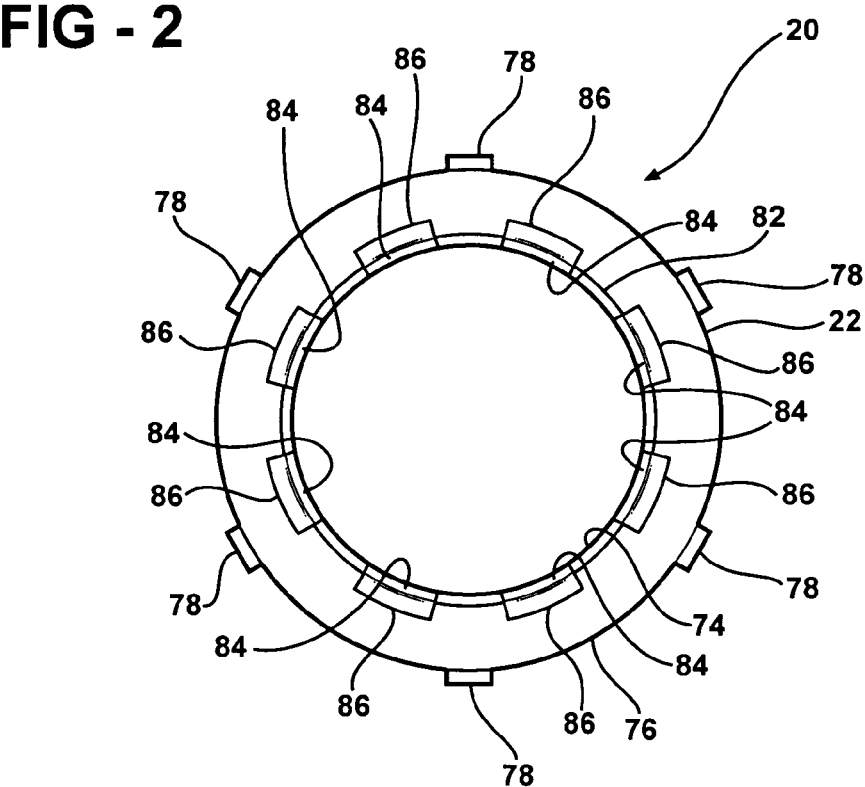
FIG. 2 is a perspective view of the retaining ring utilized in the shaft seal assembly.
Figure 3:
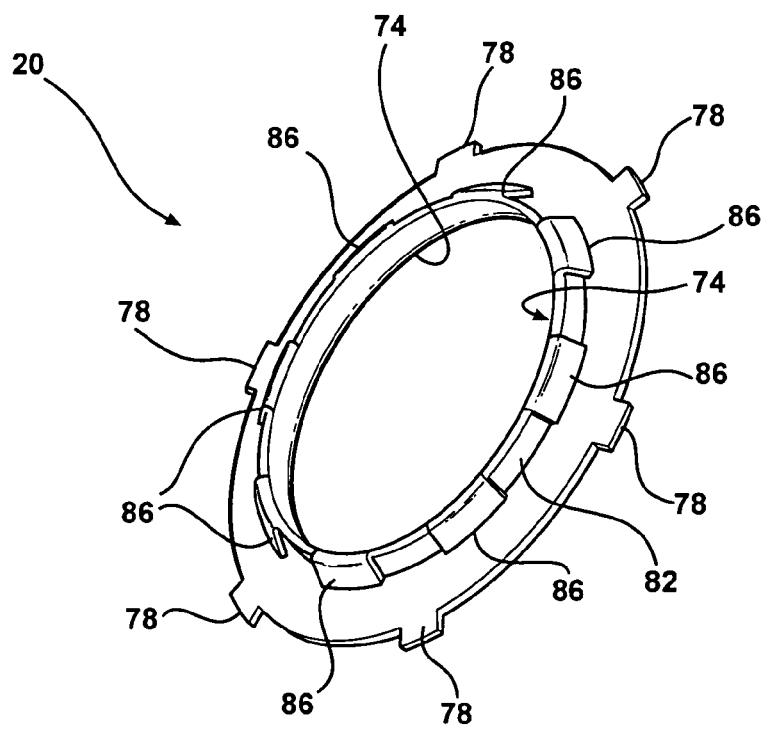
FIG. 3 is a side view of the retaining ring shown in FIG. 2.

Referring to the Figures, wherein like numerals indicate like or corresponding parts throughout the several views, a shaft seal assembly is generally shown at 10 in FIG. 1. The seal assembly 10 is shown in use within a housing 11 having a cylindrical bore 12. The bore 12 receives a rotatable shaft 13 therethrough.

The seal assembly 10 includes an annular carrier 14. A radially acting annular shaft seal element 16 is mounted on the carrier 14 and encircles the rotating shaft 13 to be sealed. An annular felt washer 18 is fixed to the carrier 14, such that the carrier 14, shaft seal element 16 and felt washer 18 are unitized. Although the washer 18 may be fixed to the carrier 14 utilizing any suitable method, the washer 18 is fixed to the carrier 14 by adhesion. Adhering the washer 18 to the carrier 14 maintains the carrier 14 wedged against the seal element 16, and secures the seal element 16, carrier 14 and washer 18 together as an integral unit which can be assembled prior to distribution and sale to a supplier or an end user.

The assembly 10 also includes an annular retainer 20 for retaining the shaft seal element 16 in engagement with the shaft 13. The retainer 20 is integral with the carrier 14, and includes an inner edge 22 and an outer edge 24.

As is shown in FIG. 1, the carrier 14 also includes inner and outer cases, 26 and 28, respectively, that extend in axially and radially spaced relation to one another to define a recess 30 therebetween for receiving the retainer 20. This maintains the shaft seal element 16 in engagement with the shaft 13. One skilled in the art will appreciate that the inner case 26 and outer case 28 may each be formed from any material rigid enough to provide underlying structural support to the shaft seal element 16. By way of non-limiting example, the cases 26 and 28 in FIG. 1 are formed from metal.

The inner case 26 has an L-shaped cross section, with a leg 32 from which a first end flange 34 extends. The outer case 28 has interior and exterior surfaces 36 and 38, and a first end 40 from which an annular support flange 42 extends. The support flange 42 has a sinuate cross-sectional shape, which provides enhanced support to the shaft seal element 16. The outer case 28 also has a second end 44 from which a second end flange 46 extends. The first and second end flanges 34 and 46, respectively, define the recess 30.

The shaft seal element 16 includes a laydown seal member 48 fabricated from polytetrafluoroethylene for axially bending to extend along the shaft 13. The shaft seal element 16 also includes a radial lip member 50 fabricated of rubber. The lip member 50 extends in axially and radially spaced relation to the laydown seal member 48 to engage the shaft 13.

As is shown in FIG. 1, the laydown seal member 48 has a generally L-shaped cross section, with a primary leg 52 from which an interior flange 54 extends. The leg 52 is interposed between the support flange 42 and the inner case 26 so that the interior flange 54 extends toward the radial lip member 50 in dynamic sealing engagement with the shaft 13.

Although the laydown seal member 48 shown in FIG. 1 is formed from polytetrafluoroethylene, one skilled in the art will appreciate that the seal member 48 may be formed from any suitable alternative vinyl polymer. Furthermore, while the seal member 48 may be fabricated using any suitable method, the seal member 48 shown in FIG. 1 is fabricated of a polytetrafluoroethylene disk or wafer clamped between the inner and outer cases 26 and 28, respectively, and sealed against leakage against an intervening surface 56 of a portion 58 of seal element 16, which is interposed between the outer case 28 and the primary leg 52.

While the lip member 50 may be formed from any suitable rubber, or elastomer, the lip member 50 shown in FIG. 1 is formed from polybutadiene.

The radial lip member 50 includes a face seal 60 that extends from the first end 40 over part of the exterior surface 38 of the outer case 28. The face seal 60 serves as a protective cushion between the outer case 28 and the bore 12, and includes a plurality of annular ridges 62. The ridges 62 are for static sealing engagement with the bore 12 and cooperate with the other surfaces of the assembly 10 that contact the bore 12 and shaft 13 to maintain the assembly 10 properly positioned against the shaft 13.

The radial lip member 50 also includes a sealing portion 64 having an inner surface 66 and an outer surface 68. The sealing portion 64 extends from the support flange 42 to a tip 70 and dynamically seals and engages the shaft 13 to control oil flow from the outer surface 68 to the inner surface 66 as the shaft 13 rotates.

A retaining portion 72 extends from the retainer 20 into the recess 30 and acts to retain the retainer 20 in engagement with the bore 12 through which the shaft 13 extends. The retaining portion 72 engages the laydown seal member 48 and the lip member 50. Positioning the retaining portion 72 within the recess 30 in this manner wedges the retaining portion 72 between the laydown seal member 48 and the lip member 50.

The retainer 20 also has an inner edge 74 and an outer edge 76. A plurality of spaced peripheral tabs 78 extend from the outer edge 76 for engaging the bore 12. The tabs 78 are received within and engage an annular groove 80 within the bore 12. The retaining portion 72 has a cylindrical wall 82 that extends perpendicularly from the inner edge 74 toward the lip member 50 to an interior edge 84. A plurality of spaced spring tabs 86 extend at an acute angle "α" from the interior edge 84 into the recess 30. Each spring tab 86 engages the laydown seal member 48. The interior edge 84 engages the lip element 50. This wedges the spring tabs 86 between the laydown seal member 48 and the lip member 50.

Although not required, the washer 18 shown in FIG. 1 includes an integral flange 88. The retainer 20 is held in place against the seal element using the flange 88. The flange 88 extends axially under the retaining portion 72 to the lip member 50. This permits the flange 88 to engage the retaining portion 72, which in turn maintains the retaining portion 72 wedged between the laydown seal member 48 and the lip member 50. The flange 88 also holds the retainer 20 in place within the groove 80 after the seal assembly 10 is installed within the bore 12. The flange 88 is held in place against the retainer 20 by adhering the cylindrical wall 82 to the flange 88.

Obviously, many modifications and variations of the present invention are possible in light of the above teachings. The invention may be practiced other than as specifically described within the scope of the claims. Furthermore, the foregoing description of the preferred embodiment of the invention and the best mode for practicing the invention are provided for the purpose of illustration only and not for the purpose of limitation—the invention being defined by the claims.

I claim:

1. A seal assembly (10), comprising;
   an annular carrier (14) establishing an axial direction;
   a radially acting annular shaft seal element (16) mounted on said carrier (14) for encircling a rotating shaft (13) to be sealed, said shaft seal element (16) including a laydown seal member (48) fabricated of polytetrafluoroethylene for axially bending to extend along the shaft (13) and a radial lip member (50) fabricated of rubber and extending in axially and radially spaced relation to said laydown seat member (48) to engage the shaft (13);
   an annular felt washer (18) fixed to said carrier (14) axially proximate said laydown seal member (48) such that said laydown seal member (48) is axially interposed between said felt washer (18) and said radial lip member (50),
   an adhesive disposed between said felt washer (18) and said carrier (14), such that said carrier (14), said shaft seal element (16) and said felt washer (18) are unitized, and
   an annular retainer (20) for retaining said shaft seal element (16) in engagement with the shaft (13),
   wherein said carrier (14) includes an inner case (26) and an outer case (28) extending in axially and radially spaced relation to one another to define a recess (30) therebetween for receiving said retainer (20) to maintain said shaft seal element (16) in engagement with the shaft (13).

2. A seal assembly (10) as set forth in claim 1 and including a retaining portion (72) extending from said retainer (20) into said recess (30) for retaining said retainer (20) in engagement with a bore (12) through which the shaft (13) extends.

3. A seal assembly (10) as set forth in claim 2 wherein said retaining portion (72) engages said laydown seal member (48).

4. A seal assembly (10) as set forth in claim 2 wherein said retaining portion (72) engages said laydown seal member (48) and said lip member (50).

5. A seal assembly (10) as set forth in claim 2 wherein said retaining portion (72) is wedged between said laydown seal member (48) and said lip member (50).

6. A seal assembly (10) as set forth in claim 2 wherein said retainer (20) includes an inner edge (22) and said retaining portion (72) includes a cylindrical wall (82) extending perpendicularly from said inner edge (74) toward said lip member (50) to an interior edge (84).

7. A seal assembly (10) as set forth in claim 6 wherein said retainer (20) includes an outer edge (76) with a plurality of spaced peripheral tabs (78) extending therefrom for engaging the bore (12).

8. A seal assembly (10) as set forth in claim 6 wherein said retaining portion (72) includes a plurality of spaced spring tabs (86) extending at an acute angle from said interior edge (84) into said recess (30) to engage said laydown seal member (48).

9. A seal assembly (10) as set forth in claim 8 wherein said interior edge (84) engages said lip element (50) to wedge said spring tabs (86) between said laydown seal member (48) and said lip member (50).

10. A seal assembly (10) as set forth in claim 2 wherein said washer (18) includes an annular flange (88) extending axially under said retaining portion (72) to said lip member (50).

11. A seal assembly (10) as set forth in claim 10 wherein said flange (88) engages said retaining portion (72) to wedge said retaining portion (72) between said laydown seal member (48) and said lip member (50).

12. A seal assembly (10) as set forth in claim 11 wherein said cylindrical wall (82) is secured to said flange (88).

13. A seal assembly (10), comprising:

an annular carrier (14) establishing an axial direction;

a radially acting annular shaft seal element (16) mounted on said carrier (14) for encircling a rotating shaft (13) to be sealed, said shaft seal element (16) including a laydown seal member (48) fabricated of polytetrafluoroethylene for axially bending to extend along the shaft (13) and a radial lip member (50) fabricated of rubber and extending in axially and radially spaced relation to said laydown seal member (48) to engage the shaft (13);

an annular felt washer (18) fixed to said carrier (14) axially proximate said laydown seal member (48) such that said laydown seal member (48) is axially interposed between said felt washer (18) and said radial lip member (50), an adhesive disposed between said felt washer (18) and said carrier (14), such that said carrier (14), said shaft seal element (16) and said felt washer (18) are unitized, and an annular retainer (20) for retaining said shaft seal element (16) in engagement with the shaft (13), wherein said washer (18) includes an annular flange (88) axially underlying said retainer (20).

14. A shaft seal assembly (10), comprising:

an annular carrier (14);

a radially acting annular shaft seal element (16) mounted on said carrier (14) for encircling a rotating shaft (13) to be sealed;

an annular retainer (20) integral with said carrier (14) for retaining said shaft seal element (16) in engagement with the shaft (13) and including an inner edge (74) and an outer edge (76) having a plurality of spaced peripheral tabs (78) extending therefrom for engaging a bore (12) through which the shaft (13) extends;

said shaft seal element (16) including a laydown seal member (48) fabricated of polytetrafluoroethylene for axially bending to extend along the shaft (13) and a radial lip member (50) fabricated of rubber;

said carrier (14) including an inner case (26) and an outer case (28) extending in axially and radially spaced relation to one another to define a recess (30) therebetween for receiving said retainer (20) to maintain said shaft seal element (16) in engagement with the shaft (13);

a retaining portion (72) extending from said retainer (20) into said recess (30) and wedged in engagement between said laydown seal member (48) and said lip member (50) for retaining said retainer (20) in engagement with the bore (12);

said retaining portion (72) including a cylindrical wall (82) extending perpendicularly from said inner edge (84) toward said lip member (50) to an interior edge (84) engaging said lip member (50) for wedging said spring tabs (86) between said laydown seal member (48) and said lip member (50);

a plurality of spaced spring tabs (86) extending at an acute angle from said interior edge (84) into said recess (30) to engage said laydown seal member (48); and an annular felt washer (18) fixed by adhesion to said carrier (14), such that said carrier (14), said shaft seal element (16) and said felt washer (18) are unitized, and including an annular flange (88) engaging said retaining portion (72) and extending axially thereunder to said lip member (50) for wedging said retaining portion (72) between said laydown seal member (48) and said lip member (50).

* * * * *

UNITED STATES PATENT AND TRADEMARK OFFICE
CERTIFICATE OF CORRECTION

| | | |
|---|---|---|
| PATENT NO. | : 7,147,229 B2 | Page 1 of 1 |
| APPLICATION NO. | : 10/800456 | |
| DATED | : December 12, 2006 | |
| INVENTOR(S) | : Christopher Madigan | |

It is certified that error appears in the above-identified patent and that said Letters Patent is hereby corrected as shown below:

Column 4, line 11: "said laydown seal member" should read --said laydown seat member--.

Signed and Sealed this

Twelfth Day of June, 2007

JON W. DUDAS
*Director of the United States Patent and Trademark Office*